(12) United States Patent
Mohamed

(10) Patent No.: US 9,067,534 B2
(45) Date of Patent: Jun. 30, 2015

(54) METHOD AND DEVICE FOR ADJUSTING A LIGHT EMISSION OF AT LEAST ONE HEADLIGHT OF A VEHICLE

(75) Inventor: Manoj Mohamed, Kerala (IN)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

(21) Appl. No.: 13/587,698

(22) Filed: Aug. 16, 2012

(65) Prior Publication Data

US 2013/0051041 A1    Feb. 28, 2013

(30) Foreign Application Priority Data

Aug. 23, 2011    (DE) .......................... 10 2011 081 412

(51) Int. Cl.
*B60Q 1/04*        (2006.01)
*B60Q 1/12*        (2006.01)

(52) U.S. Cl.
CPC ............. *B60Q 1/12* (2013.01); *B60Q 2300/114* (2013.01); *B60Q 2300/134* (2013.01); *B60Q 2300/122* (2013.01)

(58) Field of Classification Search
CPC .................. B60Q 2300/114; B60Q 2300/134; B60Q 2300/122
USPC ........ 701/301, 49, 36, 45; 362/459, 464, 465, 362/466
See application file for complete search history.

(56) References Cited

U.S. PATENT DOCUMENTS

| | | | | |
|---|---|---|---|---|
| 4,039,782 A | * | 8/1977 | Burckhardt et al. ............ | 701/49 |
| 5,876,113 A | * | 3/1999 | Gotoh ........................... | 362/466 |
| 5,909,949 A | * | 6/1999 | Gotoh ........................... | 362/37 |
| 6,547,424 B2 | * | 4/2003 | Hasumi et al. ................ | 362/465 |
| 7,036,963 B2 | * | 5/2006 | Fukawa ......................... | 362/465 |
| 7,150,546 B2 | * | 12/2006 | Fukawa ......................... | 362/464 |
| 7,239,951 B2 | * | 7/2007 | Sugimoto et al. ............... | 701/49 |
| 8,297,810 B2 | * | 10/2012 | Kettern-Kohler ............... | 362/465 |
| 8,469,561 B2 | * | 6/2013 | Shiao et al. .................... | 362/475 |
| 8,556,480 B2 | * | 10/2013 | Ohno et al. .................... | 362/522 |
| 2002/0039296 A1 | * | 4/2002 | Nishimura et al. ............. | 362/465 |

(Continued)

FOREIGN PATENT DOCUMENTS

| | | |
|---|---|---|
| DE | 103 45 304 | 4/2005 |
| DE | 10 2004 020 493 | 11/2005 |

(Continued)

OTHER PUBLICATIONS

Ramanata, "Chapter 2: Vehicle Dynamics Modeling," 1998, Thesis for Virginia Polytechnic Institute and State University.*

(Continued)

*Primary Examiner* — Thomas G Black
*Assistant Examiner* — Sara Nelson
(74) *Attorney, Agent, or Firm* — Kenyon & Kenyon LLP

(57) ABSTRACT

A method for adjusting a light emission of at least one headlight of a vehicle includes: a step for detecting an unstable travel condition of the vehicle defined as having a direction of a longitudinal axis of the vehicle differing by more than a tolerance range from a direction of motion of the vehicle; a step for providing a control signal for changing the light emission of the headlight of the vehicle in response to the detected unstable driving condition, the control signal being developed to effect a change in the light radiation characteristic of the at least one headlight of the vehicle, for adjusting the light emission.

13 Claims, 2 Drawing Sheets

(56) References Cited

U.S. PATENT DOCUMENTS

| | | | |
|---|---|---|---|
| 2002/0044453 A1* | 4/2002 | Naganawa et al. | 362/539 |
| 2002/0080618 A1* | 6/2002 | Kobayashi et al. | 362/466 |
| 2002/0196636 A1* | 12/2002 | Dassanayake et al. | 362/465 |
| 2003/0007364 A1* | 1/2003 | Nakata | 362/514 |
| 2004/0204808 A1* | 10/2004 | Satoh et al. | 701/41 |
| 2006/0028832 A1* | 2/2006 | Horii et al. | 362/514 |
| 2006/0239508 A1* | 10/2006 | Maki | 382/104 |
| 2008/0084286 A1* | 4/2008 | Teramura et al. | 340/438 |
| 2009/0043458 A1* | 2/2009 | Kamioka et al. | 701/49 |
| 2010/0149827 A1* | 6/2010 | Kettern-Kohler | 362/507 |
| 2011/0069303 A1* | 3/2011 | Mehr et al. | 356/121 |
| 2011/0211359 A1* | 9/2011 | Shiao et al. | 362/476 |

FOREIGN PATENT DOCUMENTS

| | | |
|---|---|---|
| DE | 10 2004 022 289 | 12/2005 |
| DE | 10 2004 060 880 | 7/2006 |
| DE | 10 2006 036 361 | 2/2008 |
| DE | 10 2008 031 159 | 1/2010 |
| DE | 10 2009 035 634 | 2/2011 |
| EP | 1 859 991 | 11/2007 |
| EP | 1 923 261 | 5/2008 |
| EP | 2 279 923 | 2/2011 |

OTHER PUBLICATIONS

Abdulrahim, "On the Dynamics of Automobile Drifting," 2006, University of Florida.*

* cited by examiner

METHOD AND DEVICE FOR ADJUSTING A LIGHT EMISSION OF AT LEAST ONE HEADLIGHT OF A VEHICLE

BACKGROUND OF THE INVENTION

1. Field of the Invention

The present invention relates to a method for adjusting a light emission of at least one headlight of a vehicle, as well as to a corresponding device as well as to a corresponding computer program product.

2. Description of the Related Art

When skidding occurs during cornering of a vehicle, frequently those areas of a roadway are not sufficiently illuminated into which the vehicle is moving during the skidding process. In order to reduce such problems, in published German patent application document DE 10 2006 036 361 A1, a headlight in a vehicle is described which is able to be rotated about a vertical axis during cornering.

BRIEF SUMMARY OF THE INVENTION

The present invention presents a method for adjusting a light emission of at least one headlight of a vehicle, which method includes the following steps:
 detecting an unstable travel condition of the vehicle, in the unstable travel condition, a direction of a longitudinal axis of the vehicle differing by more than a tolerance range of a direction of motion of the vehicle; and
 providing a control signal for changing the light emission of the headlight of the vehicle in response to the detected unstable driving condition, the control signal being developed to have the effect of effecting a change in the light radiation characteristics of the at least one headlight of the vehicle, for the adjustment of the light emission.

The present invention also provides a device for adjusting a light emission of at least one headlight of a vehicle, the device including the following features:
 a unit for detecting an unstable travel condition of the vehicle, in the unstable travel condition, a direction of a longitudinal axis of the vehicle differing by more than a tolerance range from a direction of motion of the vehicle; and
 a device for providing a control signal for changing the light emission of the headlight of the vehicle, the control signal being developed to have the effect of effecting a change in the light radiation characteristics of the headlight of the vehicle, for the adjustment of the light emission.

The present invention thus creates a device that is developed to carry out or implement the steps of the method according to the present invention in corresponding pieces of equipment. The object on which the present invention is based may be attained quickly and efficiently by this embodiment variant of the invention in the form of a device, as well.

In the case at hand, by a device one may understand an electrical device which processes sensor signals and outputs control signals as a function thereof. The device may have an interface, which may be developed as hardware and/or software.

In a hardware design, the interfaces may, for example, be part of a so-called system ASIC that contains the most different functions of the device. However, it is also possible for the interfaces to be separate, integrated switching circuits or to be at least partially made up of discrete components. In a software design, the interfaces may be software modules which are present on a microcontroller in addition to other software modules, for example.

A computer program product is also of advantage, having program code that may be stored on a machine-readable carrier such as a semiconductor memory, a hard-disk memory or an optical memory, which is used to implement the method according to one of the specific embodiments described above, when the program is executed on a computer or a device.

By a longitudinal axis of the vehicle, a direction may be understood which corresponds to the direction of main extension of the vehicle. In this context, during travel, the vehicle usually travels in a direction which corresponds to the extension of this longitudinal axis within a tolerance range. By a direction of motion of the vehicle one may understand an arrangement of the motion of the vehicle above ground, which, during the skidding of the vehicle, differs from the direction of the longitudinal axis of the vehicle. The unstable travel condition is detected, in this instance, when the direction of the extension of the longitudinal axis of the vehicle deviates by more than a tolerance range from the direction of motion of the vehicle. In this case, it may be detected that the vehicle is not reacting to steering motions as it should, so that there exists an unstable travel condition. By a tolerance range one may understand, in this instance, a range, for example, of 10° deviation between the direction of the extension of the longitudinal axis of the vehicle and the direction of motion of the vehicle, in a favorable case, however, a range of 5° of deviation between the direction of the extension of the longitudinal axis of the vehicle and the direction of motion of the vehicle. By a change in the light emission of the headlight of the vehicle one may understand, for example, a specific change of the area illuminated by light of the headlight (for instance, on the roadway in front of the vehicle. By a light radiation characteristic one may understand a shape or a radiation angle, in which light is emitted by the headlight onto an area of the roadway. For example, by a change in the light radiation characteristic one may understand a rotation of the headlight about a vertical axis or even a change of at least two components of the headlight with respect to each other, in order to achieve a change in the shape and/or the position of the area illuminated by the headlight. In this case, by the change in the light radiation characteristic of the headlight the change in the light emission is also effected.

The present invention is based on the finding that, in an unstable travel condition of the vehicle, an area of the roadway is illuminated by headlights of the vehicle that the vehicle will not travel on in its movement along a movement trajectory. However, the illumination of such an area of the roadway, which will not be traveled upon, offers no advantage for the safety of the vehicle. In order to enable an increase in the safety of the vehicle, an area of the roadway should be illuminated over which the vehicle will in fact move. This may be assured in that, after the detection of such an unstable travel condition, a signal is generated for actuating a change in the light emission by a headlight of the vehicle, so that a headlight control unit sets the light radiation characteristic advantageously in such a way that an area of the roadway over which the vehicle will move even in the unstable travel condition, or which is relevant for the vehicle safety in the movement of the vehicle, is also lit up, at least partially, ahead of time by light from the headlights.

The present invention offers the advantage of being able to use the flexible headlights mostly already installed in vehicles for an additional safety function in certain, in particular, unstable travel conditions. Thereby a clear increase of vehicle safety may be implemented by implementing the provision of the control signal at very low additional cost.

It is favorable if, in the step of detection, the travel condition of the vehicle is detected, while using a physical variable with respect to a motion of the vehicle and/or a setting of a vehicle control operating element, particularly wherein the physical variable includes a yaw rate and/or a lateral acceleration and/or the setting of the vehicle control operating element includes a steering angle. Such a specific embodiment of the present invention offers the advantage that, in vehicles, many times available sensor signals are available to be used for detecting the travel condition of the vehicle. In this way, a cost-effective implementation may be carried out of the approach proposed herein without a requirement for additional sensors.

According to a further specific embodiment of the present invention, the travel condition of the vehicle may be detected in the step of detection while using image data of a camera. Such a specific embodiment of the present invention offers the advantage that, in modern vehicles, a camera is already implemented for environmental detection in mass production quantities, which, for example, is able to evaluate image data taken using a special routine, and thereby enables drawing conclusions concerning a certain, in particular, an unstable travel condition of the vehicle. This unstable travel condition may thereby be detected even without resorting to sensor signals which, directly or indirectly, evaluate a contact between a wheel and the ground or other parameters of motion dynamics, such as an acceleration or a yaw rate. The detection of the unstable travel condition becomes more robust thereby, especially if the detection of the travel condition is verified based on the evaluation of the abovementioned physical variables by the use of image data of the camera. Alternatively, a verification based on an unstable travel condition, detected by image data of a camera, may also be made based on at least one of the abovementioned physical variables.

It is particularly favorable if, in addition, a step of changing the light emission of the at least one headlight of the vehicle is provided while using the control signal, a light radiation characteristic of the headlight being changed in such a way that, after the change, at least one area between the direction of the vehicle's longitudinal axis and the direction of movement of the vehicle is lit up using a higher light intensity than before the change. Such a specific embodiment of the present invention offers the advantage of clearly better detectability of objects that are located on a movement path or in a movement trajectory of the vehicle.

According to another specific embodiment of the present invention, in the step of changing, a spatial form of the light radiation characteristic of the at least one headlight may be changed, particularly wherein a shape of a reflector of the at least one headlight is changed or at least a light source of the at least one headlight, relative to an original position in the headlight. Such a specific embodiment of the present invention offers the advantage that, because of the change, the spatial form of the light radiation characteristic may be set in a manner corresponding to the respective situation. By contrast to a simple rotation of the headlight about a vertical axis, this offers a clearly better and mostly also quicker possibility of lighting up the area of the roadway in the detected, unstable travel condition, which, in turn, results in an increase in travel safety.

In order to achieve a particularly good lighting up of an area of the roadway in front of the vehicle, in the step of changing, a light emission of an additional headlight of the vehicle may also be changed while using the control signal, the light radiation characteristic of the additional headlight being changed differently from the light radiation characteristic of the headlight. Because the light radiation characteristic of two different headlights is changed in a different manner, one is able to make a particularly flexible adjustment or design of the area illuminated by the at least two headlights, corresponding to the detected unstable driving situation or the detected driving condition of the vehicle.

In order to assure that the actuated change in the light emission is actually being implemented too, or whether possibly taking into account additional objects in front of the vehicle is required for adjusting the light emission, a step of checking the change in the light radiation of the at least one headlight using a camera may be provided, which records an area illuminated by the at least one headlight in front of the vehicle, in the direction of motion. An error in the actuation of the light emission may also, for instance, be detected in this context, so that, for example, the need for a recalibration may be pointed out and/or repair of the headlight or of components of the headlight.

DETAILED DESCRIPTION OF THE INVENTION

Figure 1:
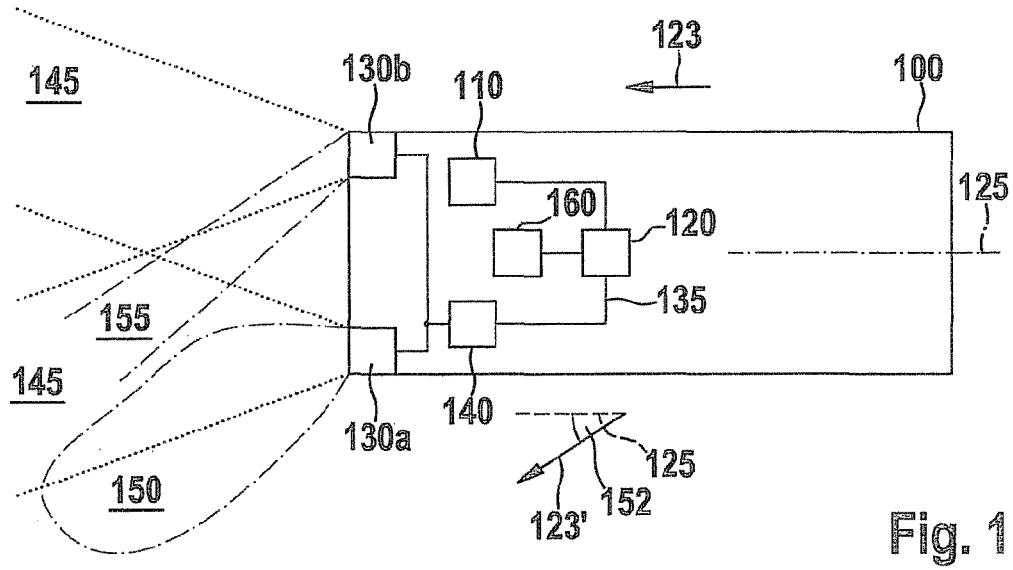
FIG. 1 shows a block diagram of a vehicle in which an exemplary embodiment of the present invention is implemented.

In the subsequent description of exemplary embodiments of the present invention, the same or similar reference numerals are used for the various elements shown in the various figures and acting similarly, repeated description of these elements then being omitted.

FIG. 1 shows a block diagram of a vehicle 100, in which an exemplary embodiment of the present invention is implemented. Vehicle 100 has a sensor 110 for a physical variable, this physical variable representing a motion of vehicle 100. This physical variable may, for instance, be a yaw rate, a lateral acceleration (that is, a lateral acceleration with respect to the travel direction), a steering angle or another physical variable which results from the motion of the vehicle or which, by a setting of a vehicle operating element, that is to be operated by the driver of vehicle 100, has an influence on the motion of the vehicle 100. A sensor signal of this sensor 110, which represents the physical variable or a plurality of physical variables, is now supplied to an evaluation unit 120, in which an ascertainment of an unstable travel condition takes place, which is to be designated as critical to safety. Such a travel condition may also be designated as an unstable travel condition. In the case of such an unstable travel condition, an actual direction of motion 123 of the vehicle, during travel of vehicle 100, deviates from the direction of extension of longitudinal axis 125 of the vehicle 100 by more than a tolerance range.

In particular, such a travel condition is able to occur if, in a travel situation, the driver of vehicle 100 oversteers or understeers the vehicle. In such a situation, the danger of a collision or of leaving the roadway is clearly increased, so that the vehicle safety in this (unstable) travel condition is endangered to a high degree. This applies particularly when, during darkness, objects are not detected, which are actually located in the path of motion of vehicle 100, but which are not homed in on by vehicle headlights 130a and 130b of vehicle 100, and are consequently not detected, or detected too late by the driver of vehicle 100. That being the case, the driver of vehicle 100 is no longer able to react in time to the presence of such an object in the actual path of motion of the vehicle, when the vehicle gets back into a stable travel condition again.

In order to avoid such a dangerous situation, in evaluation unit 120, an estimate is made of that angle which comes about between the direction of extension of longitudinal axis 125 of the vehicle and actual direction of motion 123 of vehicle 100. If this (difference) angle is outside a tolerance range of 5° or 10°, for example, about the direction of extension of longitudinal axis 125 of the vehicle or the direction of motion 123 of the vehicle 100, one may assume that an unstable travel condition, such as skidding of the vehicle 100 is present. In such a case, a change in the light emission of the headlights into the surroundings of vehicle 100 should take place, in order to supply to the driver of the vehicle 100 an improved possibility of perception of an object which is located in the actual path of motion of vehicle 100.

In order to counter such a dangerous driving situation, in evaluation unit 120 as control signal 135, for example, the actual direction of motion of vehicle 100 (which may also be designated as the drift direction of the vehicle) and an offset angle are determined which lies between the current main illumination direction of the light emission by headlight 130 and this actual direction of motion of vehicle 100. In this context, the main direction of illumination of the light emission by the headlight, which does not necessarily have to coincide with the direction of extension of the vehicle longitudinal axis 125, is able to be ascertained, and drawn upon for the ascertainment of control signal 135. The information of control signal 135 is transmitted to a headlight control unit 140, which then, while using control signal 135, actuates headlight(s) 130 in such a way that the light radiation characteristic of at least one headlight 130 is changed. Such a change in the light radiation characteristic may take place, in the case of an unstable travel condition of vehicle 100 shown in FIG. 1, in such a way, for example, that from lower headlight 130a shown in FIG. 1 a light radiation is changed from a conical shape 145 to an irregular finger shape 150, when it is detected that an offset angle 152 between the actual direction of motion 123 of vehicle 100, in the unstable travel condition, and the direction of extension of the vehicle longitudinal axis 125 is greater than a tolerance offset angle. Consequently, in this case, the actual direction of motion 123 of vehicle 100 deviates, in the unstable travel condition, by more than a tolerance range from the direction of extension of vehicle longitudinal axis 125. If in this way an unstable travel condition of vehicle 100 is detected, then, for example, by a change of one or more micromirrors in a reflector, at least one of headlights 130, namely first headlight 130a, may be reset in such a way that its light radiation characteristic is changed. Alternatively or in addition, a reflector of headlight 130a may also be pivoted about a vertical axis, so as to light up an area located at the left under vehicle 100, in FIG. 1, and thus to improve the safety of vehicle 100 during travel.

Furthermore, in headlight control unit 140 second headlight 130b may also be actuated in such a way that a light radiation characteristic with respect to an original situation is changed. In this context, the light radiation characteristic of second headlight 130b may be changed in a different manner, for instance, to another form, such as the light radiation characteristic of (first) headlight 130a. For example, the light radiation characteristic of second headlight 130b may be changed from a first conical shape 145 to another, second conical shape 155. First conical shape 145 may correspond to the original light radiation characteristic of (first) headlight 130a, in this instance, so that in this original situation both headlights 130 have the same light radiation characteristic. In this way, on account of the different change of the light radiation characteristic of first headlight 130a and second headlight 130b as good as possible a lighting up of a certain roadway area in front of vehicle 100 may be achieved, in the case of an unstable travel condition.

Alternatively or in addition, it is also possible that evaluation unit 120 undertakes the ascertainment of a certain travel condition based on image data of a camera 160, which records an area in front of vehicle 100 in images. An evaluation of a sequence of images of this camera 160 then enables, for instance, the determination that the vehicle is in an unstable travel condition, for example, in a skidding state. In this unstable travel condition, for example, longitudinal axis 125 of vehicle 100 no longer lies within a predetermined tolerance range about the direction of motion 123 of vehicle 100. Longitudinal axis 125 may be ascertained, in this instance, by a corresponding position in the image of camera 160 and a known alignment of the direction of view of camera 160.

Figure 2:
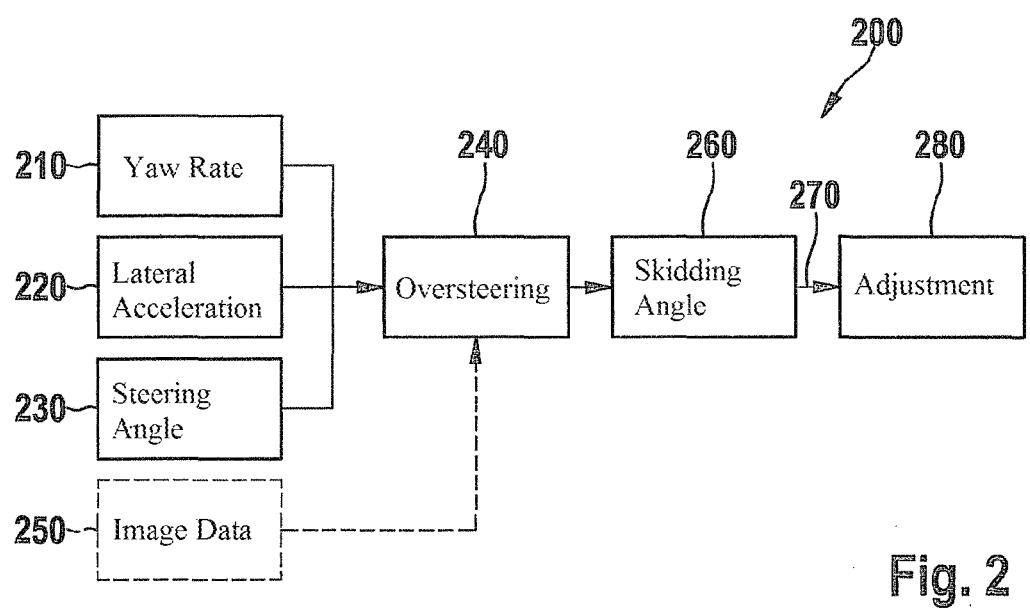
FIG. 2 shows a sequence of states that may be assumed according to an exemplary embodiment of the present invention.

FIG. 2 shows a schematic representation or a flow chart for showing an exemplary embodiment of the present invention as a method. In this context, first of all a yaw rate 210 is provided, for example, from a yaw rate sensor, a lateral acceleration 220 from a correspondingly developed lateral acceleration sensor and/or a steering angle 230 from a correspondingly developed steering angle sensor. From these data, a situation of oversteering 240 of the vehicle is subsequently ascertained.

Alternatively or in addition, this situation of oversteering 240 of the vehicle may also be determined from image data 250, which are supplied by a camera in the vehicle. In this context, the camera that supplies the image date 250 may be a single camera or a multiple camera, such as a stereo camera. Now, if such a situation of oversteering 240 is detected, an estimation 260 takes place of the vehicle's skidding angle, which is represented, for example by an angle 152 in FIG. 1, which comes about between vehicle longitudinal axis 125 and an actual direction of motion 123 of vehicle 100. This vehicle skidding angle 152 may be regarded in this case as an offset angle, about which a light emission direction of light of the headlights should be rotated maximally in the direction of motion of the vehicle, in order to assure as optimal an illumination as possible of the roadway in front of the vehicle, even at an unstable travel state such as the skidding of the vehicle. In this case, the actual direction of motion 125 and this offset angle 152 are able to be transmitted as a control signal 270 to an intelligent front light control unit, which undertakes or actuates a corresponding adjustment or change 280 of the light emission by a headlight. This change in the light emission may be implemented, for example, by the change of a light radiation characteristic of one or more headlights.

Figure 3:
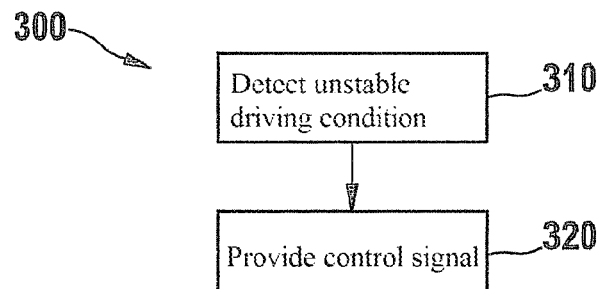
FIG. 3 shows a flow chart of an exemplary embodiment of the present invention as a method.

FIG. 3 shows a flow chart of a simplified exemplary embodiment of the present invention as method 300, for adjusting a light emission from at least one headlight of a vehicle. The method includes a step of detecting 310 of an unstable travel condition of the vehicle, in which a direction of the vehicle longitudinal axis is distinguished by more than a tolerance range from a direction of motion of the vehicle. Furthermore, method 300 includes a step of providing 320 a control signal for changing the light emission of the headlight of the vehicle in response to the detected unstable driving condition of the vehicle, the control signal being developed to effect a change in the light radiation characteristics of the at least one headlight of the vehicle, so as to effect a change in the light radiation characteristic of the headlight to adjust the light emission.

Figures 4A, 4B:
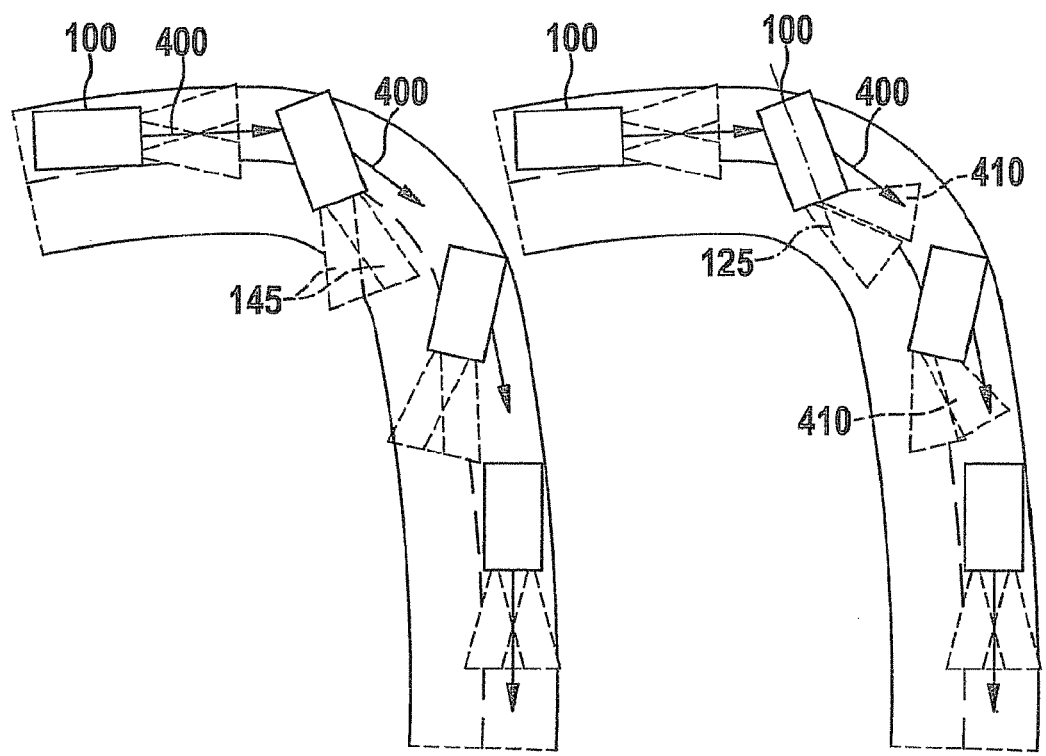
FIG. 4a shows a sequence of representations of a vehicle in an unstable driving condition at different positions on the roadway, where the present invention is not being used.
FIG. 4b shows a sequence of representations of the vehicle of FIG. 4a in an unstable driving condition at different positions on the roadway, where the present invention is being used.

FIG. 4a shows a motion sequence of this vehicle in an unstable travel condition, in a sequence of representations of a vehicle 100 at different positions on a roadway, which is caused, for example by oversteering. In the sequence of FIG. 4a, the approach that was described in detail above, is not used in this instance. As may be seen in the sequence of representations of FIG. 4a, vehicle 100 is traveling in a direction of motion 400, which corresponds to direction of motion 123 of FIG. 1, into a curve, the driver of vehicle 100, because of an underestimation of the curve radius and a subsequent recognition of this underestimation, then oversteering vehicle 100. This leads to vehicle 100 getting into skidding, so that a vehicle longitudinal axis is aligned further in the direction of the inner side of the curve than direction of motion 400 in which vehicle 100 is actually moving. From the representation according to FIG. 4a it may then be seen that the headlights each illuminate an area 145 in front of the vehicle, which will not be traveled over by vehicle 100. Now, if, for example, an object appears in an area that is not illuminated by the headlights of vehicles 100, on a lane in which vehicle 100 is moving, the driver perceives this object very late, so that he may possibly not be able to react sufficiently fast when he will have brought vehicle 100 into a stable travel condition.

By contrast, FIG. 4b shows a motion sequence of this vehicle 100 in an unstable travel condition, in a sequence of representations of this vehicle 100 at different positions on the roadway. In the motion sequence shown in FIG. 4b, the above-mentioned approach for adjusting the light emission is used.

As may be recognized from the representation of vehicle 100 at different positions of the roadway in FIG. 4b, vehicle 100 is traveling into a curve, the driver oversteering vehicle 100. Because of this, there comes about a direction of motion 400 of vehicle 100, which differs from the direction of vehicle longitudinal axis 125 by more than a tolerance range. In this case, the lighting-up characteristic of headlights of vehicle 100 is changed, so as to illuminate the roadway in an area 410, which lies in this direction of motion 400 or the trajectory of motion of vehicle 100. In this way, objects which are located in this area 410 and which form an endangerment for vehicle 100, are clearly detected better, so that the driver of vehicle 100 is thus able to react to these objects in good time. From the representation of FIG. 4b one may recognize too that the light radiation characteristics of the two headlights of vehicle 100 are originally almost identical and are changed in a different manner in response to an unstable travel condition, in order to obtain as large and optimally lit up an area 410 as possible, which in this unstable travel condition lies on the trajectory of motion of vehicle 100 which, however, has not been lit up by the vehicle's headlights, without the use of the approach presented here.

To sum up, one should note that when a vehicle gets into an oversteering situation or an understeering situation, the direction of motion of the vehicle may be different from an alignment of the vehicle and, as a result, from a direction to which the headlights are pointing. This could otherwise have as a result a non-fitting illumination of the road ahead by the headlights into the direction of motion of the vehicle.

As a result, a better illumination of the road in the direction of motion of the vehicle should be achieved.

An oversteering situation or an understeering situation is able to be detected by using a yaw rate, a lateral acceleration and a steering-angle sensor (which could perhaps be implemented as a part of an EPS system. An alternative way is using a camera for detecting and estimating an oversteering or understeering situation.

If the over/understeering situation has been detected, the direction and the extent are estimated in which the direction of the light radiation should be changed. As a function of the direction and the extent of the over/understeering, the intelligent headlight control moves the headlight beam sideways, in order to illuminate the road in the direction of motion.

If an ESP is installed in the vehicle, the probability of the vehicle's entering into an over/understeering situation is decreased. As a result, the present invention is possibly better usable if there is an explicit attempt to get into an oversteering situation (for instance, in a vehicle for skid racing).

A similar situation could occur during understeering (vehicle and headlight beam show on a curve) and a similar design approach might be proposed.

The exemplary embodiments described and shown in the figures have been selected only in exemplary fashion. Different exemplary embodiments are able to be fully combined with one another, or with regard to individual features. One exemplary embodiment may also be supplemented by features of another exemplary embodiment.

Furthermore, method steps according to the present invention may also be carried out repeatedly, as well as in a different sequence than the one described.

If the exemplary embodiment includes an "and/or" linkage between a first feature and a second feature, this may be read to mean that the exemplary embodiment, according to one specific embodiment has both the first feature and also the second feature, and according to an additional specific embodiment, either has only the first feature or only the second feature.

What is claimed is:

1. A method for adjusting a light emission of a headlight of a vehicle, comprising:
   detecting an unstable driving condition of the vehicle, wherein the unstable driving condition is defined as a condition in which a direction of a longitudinal axis of the vehicle differs by more than a predetermined tolerance range from a direction of motion of the vehicle;
   providing a control signal for changing the light emission of the headlight of the vehicle in response to the detected unstable driving condition, wherein the control signal effects a change in light radiation characteristic of the headlight to adjust the light emission; and
   changing the light emission of the headlight of the vehicle; wherein the light radiation characteristic of the headlight is changed in such a way that at least one area between the direction of the longitudinal axis of the vehicle and the direction of motion of the vehicle is lit up using a higher light intensity than before the change.

2. The method as recited in claim 1, wherein the unstable driving condition of the vehicle is detected by using at least one of a yaw rate of the vehicle, a lateral acceleration of the vehicle, and a steering angle.

3. The method as recited in claim 1, wherein the unstable driving condition of the vehicle is detected by using image data of a camera on the vehicle.

4. The method as recited in claim 1, further comprising:
checking the changing of the light radiation of the headlight by using a camera which records an area in front of the vehicle illuminated by the headlight in the direction of motion of the vehicle.

5. The method as recited in claim 1, wherein a spatial shape of the light radiation characteristic of the headlight is changed by at least one of: (i) a change in a shape of a reflector of the headlight; and (ii) a change in position of at least one light source in the headlight.

6. The method as recited in claim 1, further comprising:
changing a light radiation characteristic of an additional headlight of the vehicle by the control signal, wherein the light radiation characteristic of the additional headlight is changed differently from the light radiation characteristic of the headlight.

7. A device for adjusting a light emission of a headlight of a vehicle, comprising:
a detection unit for detecting an unstable driving condition of the vehicle, wherein the unstable driving condition is defined as a condition in which a direction of a longitudinal axis of the vehicle differs by more than a predetermined tolerance range from a direction of motion of the vehicle; and
a control unit for providing a control signal for changing the light emission of the headlight of the vehicle in response to the detected unstable driving condition, wherein the control signal effects a change in light radiation characteristic of the headlight to adjust the light emission and wherein the light radiation characteristic of the headlight is changed in such a way that at least one area between the direction of the longitudinal axis of the vehicle and the direction of motion of the vehicle is lit up using a higher light intensity than before the change.

8. The device as recited in claim 7, wherein the control unit further provides a signal for changing a light radiation characteristic of an additional headlight of the vehicle, wherein the light radiation characteristic of the additional headlight is changed differently from the light radiation characteristic of the headlight.

9. The device as recited in claim 7, wherein the detection unit further checks the changing of the light radiation of the headlight by using a camera which records an area in front of the vehicle illuminated by the headlight in the direction of motion of the vehicle.

10. The device as recited in claim 7, wherein the unstable driving condition of the vehicle is detected by using at least one of a yaw rate of the vehicle, a lateral acceleration of the vehicle, and a steering angle.

11. The device as recited in claim 7, wherein the unstable driving condition of the vehicle is detected by using image data of a camera on the vehicle.

12. The device as recited in claim 7, wherein a spatial shape of the light radiation characteristic of the headlight is changed by at least one of: (i) a change in a shape of a reflector of the headlight; and (ii) a change in position of at least one light source in the headlight.

13. A non-transitory computer-readable data storage medium storing a computer program having program codes which, when executed on a computer, implements a method for adjusting a light emission of a headlight of a vehicle, the method comprising:
detecting an unstable driving condition of the vehicle, wherein the unstable driving condition is defined as a condition in which a direction of a longitudinal axis of the vehicle differs by more than a predetermined tolerance range from a direction of motion of the vehicle; and
providing a control signal for changing the light emission of the headlight of the vehicle in response to the detected unstable driving condition, wherein the control signal effects a change in light radiation characteristic of the headlight to adjust the light emission and wherein the light radiation characteristic of the headlight is changed in such a way that at least one area between the direction of the longitudinal axis of the vehicle and the direction of motion of the vehicle is lit up using a higher light intensity than before the change.

* * * * *